United States Patent
Davis et al.

[11] Patent Number: 6,033,514
[45] Date of Patent: *Mar. 7, 2000

[54] BIAXIALLY-ORIENTED POLYPROPYLENE FILMS

[75] Inventors: Alan M. Davis, Barrington; Thomas M. Krigas, Arlington Heights, both of Ill.

[73] Assignee: QPF, LLG, Streamwood, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/732,293

[22] PCT Filed: Mar. 8, 1995

[86] PCT No.: PCT/US95/02951

§ 371 Date: Feb. 3, 1997

§ 102(e) Date: Feb. 3, 1997

[87] PCT Pub. No.: WO96/27491

PCT Pub. Date: Sep. 12, 1996

Related U.S. Application Data

[63] Continuation-in-part of application No. 08/116,426, Sep. 2, 1993, abandoned.

[51] Int. Cl.[7] ................................................. B29C 47/06
[52] U.S. Cl. ........................... 156/244.11; 156/244.12; 264/173.11; 264/235.8; 264/290.2; 264/211
[58] Field of Search ........................ 264/171.15, 171.14, 264/235.8, 290.2, 346, 211, 173.11, 173.14; 156/244.11, 244.12; 428/516, 35.9

[56] References Cited

U.S. PATENT DOCUMENTS

| | | | |
|---|---|---|---|
| 3,230,191 | 1/1966 | Roedel | 260/28.5 |
| 3,407,163 | 10/1968 | McCall et al. | 260/28.5 |
| 3,447,883 | 6/1969 | Boyer et al. | 8/4 |
| 3,522,198 | 7/1970 | Yamada et al. | 260/28.5 |
| 3,536,644 | 10/1970 | Frizelle et al. | 260/28.5 |
| 3,875,164 | 4/1975 | Bennington et al. | 260/28.5 |
| 4,032,493 | 6/1977 | Pascual | 260/28.5 |
| 4,394,235 | 7/1983 | Brandt et al. | 204/165 |
| 4,435,550 | 3/1984 | Ueno et al. | 526/73 |
| 4,472,328 | 9/1984 | Sugimoto et al. | 264/41 |
| 4,590,125 | 5/1986 | Balloni et al. | 428/349 |
| 4,666,772 | 5/1987 | Schinkel et al. | 428/330 |
| 4,681,803 | 7/1987 | Liu | 428/348 |
| 4,699,816 | 10/1987 | Galli | 428/40 |
| 4,728,478 | 3/1988 | Sacks et al. | 264/514 |
| 4,870,122 | 9/1989 | Lu | 524/488 |
| 4,921,749 | 5/1990 | Bossaert et al. | 428/216 |
| 4,956,233 | 9/1990 | Chu et al. | 428/349 |
| 5,002,989 | 3/1991 | Naumovitz et al. | 524/109 |
| 5,106,677 | 4/1992 | Yeh et al. | 428/220 |
| 5,141,801 | 8/1992 | Takeshita et al. | 428/348 |
| 5,152,946 | 10/1992 | Gillette | 264/230 |
| 5,155,160 | 10/1992 | Yeh et al. | 524/487 |
| 5,188,867 | 2/1993 | Chu et al. | 427/173 |
| 5,213,744 | 5/1993 | Bossaert | 264/171 |
| 5,451,455 | 9/1995 | Peiffer et al. | 428/323 |
| 5,482,771 | 1/1996 | Shah | 428/349 |
| 5,512,378 | 4/1996 | Bastioli et al. | 428/484 |

FOREIGN PATENT DOCUMENTS

| | | |
|---|---|---|
| 0 479 101 A1 | 4/1992 | European Pat. Off. |
| 0 588 667 A2 | 3/1994 | European Pat. Off. |
| 0 594 083 A1 | 4/1994 | European Pat. Off. |
| 49-47478 | 5/1974 | Japan. |
| WO 93/11937 | 6/1993 | WIPO. |

*Primary Examiner*—Jan H. Silbaugh
*Assistant Examiner*—Mark Eashoo
*Attorney, Agent, or Firm*—Marshall, O'Toole, Gerstein, Murray & Borun

[57] ABSTRACT

A biaxially-oriented polypropylene (BOPP) film with improved barrier properties, and a method of making the film are provided. The MVTR of a multi-layer BOPP film is improved by blending wax in the core layer resin, and providing a polyolefin cap layer on each side of the core layer. Significant additional improvements are seen when the film is heated at a temperature below the melting point of the core layer resin, below the distortion temperature of the film, and above the melting point of the wax for a time generally extending from at least five minutes to several hours or more in length, depending on the temperature.

32 Claims, No Drawings

BIAXIALLY-ORIENTED POLYPROPYLENE FILMS

CROSS-REFERENCE TO RELATED APPLICATION

This is the U.S. National Phase of International Application No. PCT/US95/02951 filed Mar. 8, 1995, which is a continuation-in-part of application Ser. No. 08/116,426 filed Sep. 2, 1993, now abandoned, the entire disclosure of which is incorporated herein by reference.

BACKGROUND OF THE INVENTION

1. Field of the Invention

This invention relates to a polyolefin film structure with improved barrier properties. In one aspect, the invention concerns a method of making a multilayer biaxially-oriented polypropylene film by incorporating in a core layer a minor amount of wax to improve the moisture barrier and haze properties thereof.

2. Description of Related Art

Biaxially-oriented polypropylene (BOPP) films are widely used in packaging because they have good stiffness, strength, optical properties (low haze and high gloss), and moisture barrier properties. Good resistance to moisture transmission, as measured by the "moisture vapor transmission rate" ("MVTR"), is quite desirable in packaging of food items containing salt or sugar or ingredients that are inherently hygroscopic. Conversely, an item packaged with a specific, intended moisture content will be better able to maintain that required moisture and not dry out if it is packaged with a high moisture barrier film. An essential purpose of the BOPP barrier film is to extend the package shelf life.

Since barrier properties increase with film thickness, a thicker film made either by direct film extrusion and orientation or by lamination of two or more films can be expected to have an improved (i.e., reduced) MVTR. Although these thicker films remain clear, haze and gloss properties can suffer. Small improvements come at significant expense, as film costs increase proportionately with thickness.

One important method to reduce MVTR in BOPP packaging films is to coat the film with a thin layer of metal, e.g., aluminum, which can result in four- to ten-fold improvements in MVTR values. Such metallized film then becomes opaque, however, and the package contents cannot be viewed.

Resistance to moisture and especially oxygen transmission can also be improved by coating a BOPP film with poly(vinylidine chloride) ("PVDC"), or less commonly by coextruding a layer of PVDC or its copolymers with polypropylene, followed by orientation of the film. While such films are useful, they have several disadvantages. First, an adhesive or tie-layer is often needed to prevent delamination of layers of these two incompatible materials. Second, relatively thin coatings of PVDC provide an MVTR reduction of only a factor of two or three at best. Finally, the chloride in PVDC discourages recycling of the films.

Packaging films incorporating layers of poly(vinyl alcohol) ("PVA") or copolymers of ethylene and vinyl alcohol ("EVOH") can provide excellent oxygen barrier properties, but are unsuitable for high moisture barrier. The PVA or EVOH layers must be sandwiched between polyolefin layers to protect the PVA or EVOH from absorbing moisture and thereby losing the oxygen barrier. As with PVDC films, these films also require adhesive layers or tie-layers to prevent delamination.

Yet another approach, as taught in U.S. Pat. No. 4,921,749 to Bossaert et al., assignors to Exxon Chemical Patents Inc., has been to add to a polypropylene base layer a low molecular weight modifier such as hydrogenated petroleum resin in an amount from 3 to 30% by weight. The film is then biaxially-oriented and is said to achieve a 40% reduction in MVTR. However, this technique is subject to evolution of smoke and plateout on equipment during production, and is relatively costly at the concentrations of hydrocarbon resin used.

More recent work in U.S. Pat. No. 5,155,160 to Yeh et al. shows that the barrier properties of polyolefin films can be reduced by a factor of four or more if a partially incompatible wax is added, generally in an amount between about two and twelve weight percent, to the polyolefin.

When the materials taught by Bossaert et al. '749 and by Yeh et al. '160 are added to polypropylene film, particularly at the higher percentages taught therein, film shrinkage becomes an issue. In most packaging applications, good film dimensional stability is desired to avoid distortion of the package. These additives often migrate to the film surface where they may transfer to and "plate out" on packaging equipment or the goods themselves. Moreover, the surface properties of the film such as the coefficient of friction (slipperiness), film stiffness, heat seal characteristics, and printability can be adversely affected.

SUMMARY OF THE INVENTION

It is an object of the invention to produce a biaxially-oriented polypropylene film that has good processing characteristics in combination with improved moisture barrier properties.

According to the invention, a thermoplastic film is made by forming a blend of a polypropylene resin and an incompatible wax, extruding and casting the blend to form a core layer of a film, orienting the core layer in biaxial directions, and providing on each side of the core layer a polyolefin cap layer to provide a multilayer film.

The core layer may be oriented before or after the cap layers are provided. Preferably, the core layer is oriented in a first direction before the cap layers are provided, with the resulting multilayer film then being oriented in a second direction transverse to the first direction.

Wax may be incorporated in an amount less than previously thought to be effective, thus minimizing problems associated with plate out of wax on packaging equipment.

Significant additional improvements can be achieved when the biaxially oriented film is heated to a temperature below the melting point of the core layer resin, below the distortion temperature of the film, and above the initial melting point of the wax for a time generally extending from at least five minutes to several hours or more in length, depending on the temperature.

Further objects and advantages of the invention may be apparent from a review of the following detailed description, taken in conjunction with the appended claims.

DESCRIPTION OF PREFERRED EMBODIMENTS

The invention provides a method of making multilayer sheet or film having at least three layers, as described below, and the products thereof.

Core Layer Resin

The interior layer, or one of the interior layers if more than one, is called the "core" layer and comprises polypropylene.

The term "polypropylene" as used herein is a generic reference to a semi-crystalline polymer with a majority of polymerized propylene, specifically including isotactic homopolymers of propylene, copolymers of propylene with up to twenty-five percent ethylene or butene, terpolymers of propylene with ethylene and butene, and mixtures thereof.

Preferred resins are those selected from propylene homopolymers and copolymers of propylene with less than three weight percent comonomer such as ethylene or butene. Melt flow rates of 1 to 15 dg/min, as measured according to ASTM D1238-90b, Condition 230/2.16 (formerly Condition F), and preferably from 1.5 to 6 dg/min, are suitable for sheet or blown film. Examples of suitable commercial polypropylenes include Quantum 7300, Amoco 6314, Solvay 2108, and Fina 3275 polypropylene resins.

There are no restrictions on the thickness of the core layer, other than the oriented polypropylene tenter process limitations, typically about 12 microns to about 50 microns.

Wax

The polypropylene core layer contains an incompatible wax, and preferably a small amount thereof. By "incompatible" is meant that the wax has only limited solubility with the polypropylene. Both natural and synthetic waxes can be employed, including petroleum waxes such as paraffin wax (predominately straight-chain saturated hydrocarbons) and microcrystalline wax (predominately cyclic saturated hydrocarbons with isoparaffins), vegetable waxes (e.g., carnauba), mineral waxes, and animal waxes (e.g., spermaceti) waxes. Paraffins and polyethylene waxes are preferred.

Waxes with a crystalline morphology appear to provide better moisture barrier in this invention. While not intending to be bound by theory, a preferred wax such as linear, highly-crystalline polyethylene is believed to remain incompatible with the crystalline regions of polypropylene, and will concentrate in the amorphous regions of the resin. Furthermore, the wax is believed to migrate throughout the polyolefin cap layers to the surface thereof in a controlled manner during processing of the film. It is believed the wax at the film surface forms a continuous, highly crystalline layer, thereby dramatically reducing moisture permeation.

The wax should have a molecular weight of from 300 to 1000 and preferably from 500 to 800. Melting points of such waxes are expected to be between 50° C. to 140° C. (122° F. to 284° F.), depending upon the chain length. An example of a polyethylene-type wax is POLYWAX brand wax available from Petrolite Corporation, which is a mixture of synthetic polyethylenes of several molecular weights with a specified average molecular weight.

The amount of wax in the core layer preferably ranges from 0.25 percent to 15 percent of the total weight of the resin-wax blend. Higher amounts are impractical because of the difficulty in blending large quantities of wax with polypropylene, and are further discouraged to avoid problems with film shrinkage. It has been found that substantial improvements in MVTR with minimal shrinkage can be achieved with wax amounts below five percent, preferably between 0.25 and three percent, more preferably less than two percent, and most preferably between 0.5 and two percent.

Blending of Resin and Wax

Blending of the wax and core layer resin can be accomplished by conventional methods; the objective is to produce a homogenous blend. The two components can be separately fed in two streams into the feed throat of an extruder. Alternatively, they can be premixed in a blender (e.g., a Henschel mixer) and then weigh-fed into an extruder. Because of the bulk density differences and quite different melting behavior of the two ingredients, it is especially preferred to melt blend them to produce a concentrate of wax in a polyolefin carrier, which is then itself mixed with the core layer resin in the extruder hopper. A concentrate of about 15 weight percent wax in a carrier resin (e.g., PETROTHENE PP7300 polypropylene from Quantum Chemical Company) has been found to work well. Preferred blending devices are twin screw extruders, kneaders, or similar intensive mixers, especially those equipped with underwater die face pelletizers.

Cap Layers

A polyolefin cap layer is provided on each side of the core layer. This cap can be the same as, but is preferably different from, the polypropylene of the core layer. The two cap layers can be of the same or different material and thickness. Cap layers can but need not be as thick as the core layer, and cap layer thicknesses of two microns or less are sufficient and preferred. The cap layers are preferably immediately adjacent to the core layer, but can also be separated by one or more intermediate layers of another resin or an adhesive. Additional layers, for example a seal layer, may also be added to the exterior of the formed film.

The cap layer polyolefin is selected from propylene and ethylene homopolymers, copolymers, terpolymers, or blends thereof. Preferred polyolefins are selected from the group consisting of propylene homopolymers, ethylene homopolymers, copolymers of ethylene and propylene, copolymers of propylene with butene, copolymers of ethylene and alpha-olefins of ten or less carbon atoms, copolymers of ethylene and an unsaturated carboxylic acid, copolymers of ethylene and vinyl acetate, terpolymers of propylene, ethylene, and butene, and ionomers of ethylene and methacrylic acid. Especially preferred are random ethylene-propylene copolymers containing ten percent or less ethylene by weight, copolymers of propylene with butene, and terpolymers of propylene, ethylene, and butene. Commercial sources of such polyolefins are well known in the art.

The cap layers do not initially contain added wax, although wax migrates from the core layer into and through the cap layer polymer during processing of the film. Any of the film layers in the structure may also include minor amounts of conventional additives such as antioxidants, pigments, slip agents, antiblocks, fillers, stabilizers, and the like. In some films, slip agents or coefficient of friction ("COF") agents can comprise materials which increase film surface "slipperiness" and reduce the coefficient of friction of the film so that processing problems such as film breakage can be avoided. Examples of these are fatty acid amides, erucamides, oleamides, and silicones. Minor amounts (e.g., less than about 0.5 weight percent, preferably less than 0.25 weight percent) of such additives in the cap layer are not expected to destroy the effect of improved MVTR.

Film

Manufacturing multi-layered biaxially-oriented films can be accomplished by several different processes known to those in the art.

In general, a biaxially oriented multilayer film is made according to the invention by forming a blend of a polypropylene resin and wax as described above, extruding and casting the blend to form a core layer, orienting the core layer in biaxial directions, and providing on each side of the core layer a polyolefin cap layer, to provide a multilayer film, whereby loss of wax from the film is avoided. The core layer may be oriented in one direction before the cap layers are added or, alternatively, the core layer and cap layers may be biaxially oriented together. Biaxial orientation may be carried out sequentially or simultaneously.

In one embodiment of the invention, the cap layers are provided to the core layer by coextrusion therewith. In this case, the multilayer film (i.e., the core layers and the cap layers) is biaxially oriented together.

In another embodiment, cap layers are added to the core layer by interdraw coating or lamination, as disclosed in U.S. Pat. No. 5,156,904 to Rice et al., the disclosure of which is incorporated herein by reference. In this method, the core layer is formed by extruding and casting the blend of resin and wax, orienting the core layer in a first direction, providing a polyolefin cap layer on each side of the oriented core layer to provide a multilayer film, and orienting the multilayer film in a second direction transverse (and preferably perpendicular) to the first direction.

In practice, the core layer (or a coextruded laminate of the core layer and the cap layers) may be cast onto a roll maintained at a temperature in the range of, e.g., 10° C. to 100° C., reheated over rolls heated to a temperature (e.g., 100° C. to 145° C.) high enough to melt the wax in the core layer (e.g., 88° C. for wax having a molecular weight of 500) yet below the melting point of the propylene polymer of the core layer or the coextruded cap layers (if present), and then oriented in a machine direction. After the subsequent addition of cap layers (if none are already present, or as additional cap layers), the resulting film is reheated to a temperature preferably higher than the melting point of the cap layers (e.g., 135° C.) and higher than the initial melting point of the wax but somewhat below the melting point of the core layer polypropylene (e.g., 150° C. to 165° C.), and the film is oriented in a second direction transverse (and preferably perpendicular) to the machine direction. During the second reheating step, wax migrates through the cap layers to the respective surfaces thereof but flash-off of wax is avoided so that loss of wax from the film, if any, is insubstantial.

The method of the invention and particularly the preferred interdraw coating or lamination method of the invention, avoids undesirable flash-off of wax from the film during orientation, which would be counterproductive to the desired improvement in barrier properties. Biaxial orientation is an important aspect of the invention because orientation results in an improvement in MVTR, as compared to, for example, a cast film without orientation.

Heat Treatment

After formation and orientation of the BOPP film, it may optionally be subjected to a final heat treatment, such as in an oven or "hot room." It is believed that the heat treatment causes the wax to further migrate from the core layer to the adjacent cap layers and film surface, especially with wax having an average molecular weight in the range of 500 to 1000, particularly 800 to 1000.

The temperature of the treatment should be below the melting point of the polypropylene and below that temperature at which distortion occurs in the film, typically below 150° C. Heat treatment is preferably conducted below a temperature which may cause excessive shrinkage of the film, or about 110° C., and should be conducted above the initial melting point of the wax, typically about 50° C. for preferred waxes.

The heat treatment should be from at least five minutes to several hours or more in length, with time dependent upon the temperature. The rate of MVTR improvement is initially rapid, with further improvement possible by extended treatment over one or more days. Increases in temperature generally lessen the time needed. The time chosen is preferably one sufficient to allow migration of wax throughout the cap layers.

The invention provides a convenient, commercially effective means of improving the moisture barrier properties and other physical properties of polypropylene films. For example, addition of the wax to the film of the invention effects a beneficial reduction of oxygen transmission rate. The inventive procedure avoids the loss of wax originally present in the core layer by the provision of cap layers that control the rate of wax migration during orientation.

The following non-limiting examples illustrate the practice of benefits of the invention.

EXAMPLES

Experimental Conditions

Films were made from polypropylene containing various amounts of wax. The polypropylene was an isotactic homopolymer with a melt flow rate of 1.8 dg/min as a monolayer in Comparisons A–H and as the core layer of the multilayer structures of the examples. POLYWAX 500 wax having a density of 0.93 g/cc, a melting point of 88° C., and a molecular weight of 500 was added as a percent by weight of the resin/wax blend in examples where wax was present.

The cap (exterior) layers were formed from a 5 MFR random ethylene-propylene copolymer having 6.5 wt. % ethylene content, and contained no wax.

During manufacture, monolayers or multiple layers (including, in some cases, cap layers) were passed through a slot die at 220° C. to form a thick sheet. The sheet was heated to 120° C. by passing through heated rolls, and then drawn about 500 percent in the machine direction to form a monoaxially oriented film. (In some cases cap layers were then applied.) The film was heated further at 160° C. in a tenter oven and stretched about 900 percent in the transverse direction. The film was cooled, trimmed, and wound into a roll.

Moisture vapor transmission rate (MVTR) was measured on a MOCON Model 600 instrument. The data are reported in units of g/100 sq in/24 hours at conditions of 100° F. and 90% relative humidity (ASTM F1249). To compensate for variations in film gauge, recorded MVTR data was normalized to 1.0 mils thickness, assuming that MVTR is inversely proportional to thickness.

Comparisons A to H

The comparisons in Table I show the MVTR characteristics of wax-containing monolayer BOPP films having a measured gauge between 0.61 and 0.71 mils. No cap or seal layer was present in any of these examples.

The films containing various amounts of POLYWAX 500 wax showed no improvement in the MVTR, on average, compared to the control "A" containing zero percent wax. If Comparison H is omitted as perhaps anomalous, the remaining films showed an improvement averaging only six percent. The gloss of the control was 94, while the gloss of the others ranged from 85 to 93, as measured with Pacific Scientific's 450 Glossgard II Glossmeter using ASTM D2457. Haze of the control was 0.4, compared to a range of 0.7 to 2.3 for the others. Film haze measurements followed ASTM D1003 using a Gardner Hazeguard instrument.

TABLE I

| | MONOLAYER FILM | |
|---|---|---|
| Film | % Wax | MVTR |
| A | None | .25 |
| B | 1.1 | .22 |
| C | 2.1 | .26 |

TABLE I-continued

MONOLAYER FILM

| Film | % Wax | MVTR |
|---|---|---|
| D | 3.1 | .23 |
| E | 4.2 | .23 |
| F | 5.0 | .29 |
| G | 6.3 | .24 |
| H | 7.5 | .33 |

Examples 1 to 8

These examples show the MVTR properties of three-layer films with cap layers on each side of a polypropylene core layer which incorporates various amounts of POLYWAX 500 wax. The film had the structure A/B*/A (where "*" denotes presence of wax). The cap layers "A" contained no wax. Films had a measured gauge between 0.68 and 0.82 mils.

The films were prepared under the same process conditions as the monolayer films of Comparisons A–H, but the cap layers were applied after orientation of the core layer in the machine direction, followed by transverse orientation of the resulting three-layer film.

As shown in Table II, the average MVTR of the films containing wax fell 77% compared to the control containing no wax. This MVTR change from 0.24 to 0.059 (normalized to 1.0 mils) represents more than a four-fold improvement compared to three-layer films with no wax, and an even greater improvement over an uncapped monolayer BOPP film (see Table I), with or without wax.

TABLE II

THREE-LAYER FILM

| Film | % Wax | MVTR |
|---|---|---|
| 1 | None | .24 |
| 2 | 1.1 | .066 |
| 3 | 2.1 | .052 |
| 4 | 3.1 | .044 |
| 5 | 4.2 | .037 |
| 6 | 5.0 | .064 |
| 7 | 6.3 | .078 |
| 8 | 7.5 | .069 |

Examples 9 to 12

Examples 9 through 12 illustrate the effect of wax in various layers of films, with results shown in Table III.

The films of Examples 9–11 were coextruded films, while the film of Example 12 incorporated a three layer coextruded monoaxially oriented core, with cap layers added thereto prior to orientation in the transverse direction.

Example 9 had the structure B/B/A with no wax in any of the layers. The overall structure was 0.80 mils thick, with the core layer about 18 microns (about 0.72 mils) thick and the cap layers each representing about one micron (or about 0.04 mils) of thickness.

Example 10 had a B*/B/A structure where cap layer B* contained 2.5 percent POLYWAX 500 wax. Example 11 had a B*/B*/A structure with each of layers B* having 2.5 weight percent POLYWAX 500 wax. Example 12 was an A/C/B*/C/A five-layer symmetrical/film of 0.78 total gauge, in which the two C-layers adjacent to the core were about one micron thick propylene homopolymers with no wax. The MVTR reduction effect still existed but was diminished.

TABLE III

STRUCTURE VARIATIONS

| Film | Structure | % Wax | MVTR |
|---|---|---|---|
| 9 | B/B/A | None | 0.27 |
| 10 | B*/B/A | 2.5 | 0.25 |
| 11 | B*/B*/A | 2.5 | 0.27 |
| 12 | A/C/B*/C/A | 3.0 | 0.11 |

Examples 13 to 16

Examples 13 through 16 (not tabulated) illustrate the wax concentrations effective at reducing MVTR. Three-layer BOPP films of total gauge ranging from 0.79 to 0.81 mils were made by interdraw lamination, with core layers having concentrations of POLYWAX 500 wax of zero, 0.5, 1.0, and 2.0 weight percent. The MVTR (normalized to 1.0 mils) was 0.30, 0.12, 0.07, and 0.06 respectively. Thus, an improvement in MVTR was seen at 0.5 wt. % wax concentration.

Examples 17 to 19

These examples demonstrate improvement in MVTR when a propylene copolymer is substituted for the propylene homopolymer of the core layer. These three layer films were made by interdraw lamination.

Symmetrical three-layer films were made at 0.80 to 0.82 mils total thickness, of which the cap layers were 0.05 mils each. The core layer contained 3 MFR ethylene-propylene copolymer (PETROTHENE PP 7300 available from Quantum Chemical Company, which contained 3% ethylene. Example 17 had no wax, whereas Examples 18 and 19 had 1.5% and 3% POLYWAX 500 wax, respectively, in the core layer.

MVTR data (not tabulated) normalized to 1.0 mils show the control (#17) at 0.45, while Examples 18 and 19 show 0.11 and 0.074, respectively.

Examples 20 to 27

These examples show the effect of using waxes with higher molecular weights under conventional BOPP tenter processing conditions. The three layer films of these examples were made by interdraw lamination.

Symmetrical three-layer BOPP films of structure A/B*/A were made at 0.80 mil thickness with the propylene homopolymer core of 0.70 mil thickness containing 2.0 percent of selected linear polyethylene waxes. Petrolite POLYWAX products designated 500, 650, 800, 1000, 2000, and 3000 were used, which have average carbon chain lengths of 36, 46, 61, 71, 143, and 214 with melting points of about 88, 100, 108, 114, 125, and 127° C., respectively. only the film with POLYWAX 500 wax showed any reduction in MVTR, at 0.20. The others had MVTRs equivalent to the control at about 0.37.

Examples 28 to 47

These examples show the additional improvement in MVTR after heat treatment for three layer films made by interdraw lamination. For the three layer films in Examples 28 to 47, columns in Table IV show the weight percent of wax in the core layer, the average molecular weight of the wax (POLYWAX 500), the temperature of the heat treatment, MVTR data (normalized to 1.0 mils) obtained before heat treatment, MVTR measured after two days at the stated temperature, and the percent improvement in the MVTR measurements.

Example 43 showed no improvement after two days, but improved 4% to an MVTR of 0.348 after eight days. No initial MVTR data were available for Examples 45 and 46.

TABLE IV

HEAT TREATMENT

| Ex. | Wax Percent | Mol. Wt. Wax | Temp. °F. | MVTR Initial | MVTR @ 2 days | Percent Improv. |
|---|---|---|---|---|---|---|
| 28 | -0- | — | 120 | 0.317 | 0.317 | 0 |
| 29 | 1.0 | 500 | 120 | 0.317 | 0.122 | 61 |
| 30 | 1.5 | 500 | 120 | 0.090 | 0.038 | 58 |
| 31 | 1.75 | 500 | 120 | 0.146 | 0.025 | 83 |
| 32 | 2.0 | 500 | 120 | 0.100 | 0.033 | 67 |
| 33 | 2.25 | 500 | 120 | 0.084 | 0.027 | 67 |
| 34 | 2.5 | 500 | 120 | 0.082 | 0.040 | 51 |
| 35 | 3.0 | 500 | 120 | 0.114 | 0.025 | 78 |
| 36 | 3.0 | 500 | 120 | 0.133 | 0.025 | 81 |
| 37 | 1.5 | 655 | 120 | 0.348 | 0.082 | 76 |
| 38 | 2.5 | 655 | 120 | 0.348 | 0.054 | 84 |
| 39 | 4.5 | 655 | 120 | 0.364 | 0.078 | 78 |
| 40 | 2.0 | 500 | 140 | 0.198 | 0.057 | 71 |
| 41 | 2.0 | 655 | 140 | 0.364 | 0.079 | 78 |
| 42 | 2.0 | 800 | 140 | 0.428 | 0.364 | 15 |
| 43 | 2.0 | 1000 | 140 | 0.364 | 0.380 | — |
| 44 | -0- | — | 175 | 0.364 | 0.364 | — |
| 45 | 2.0 | 500 | 175 | — | 0.277 | — |
| 46 | 2.0 | 655 | 175 | — | 0.048 | — |
| 47 | 2.0 | 800 | 175 | 0.461 | 0.132 | 71 |

The foregoing detailed description is given for clearness of understanding only, and no unnecessary limitations are to be understood therefrom, as modifications within the scope of the invention will be obvious to those skilled in the art.

We claim:

1. A method of making a multilayer thermoplastic film having improved barrier and haze properties, comprising the steps of:
    (a) forming a blend of a polypropylene resin selected from the group consisting of isotactic homopolymers of propylene, copolymers of propylene with ethylene or butene, terpolymers of propylene with ethylene and butene and mixtures thereof, and 0.25 to 15 wt. % of a crystalline, incompatible wax having an average molecular weight of 300 to 1000;
    (b) extruding and casting the blend to form a core layer of a film;
    (c) orienting the Core layer in biaxial directions; and,
    (d) then providing on each side of the oriented core layer a polyolefin cap layer to provide a multilayer film, whereby loss of wax from said film is avoided.

2. The method of claim 1 wherein the wax is selected from the group consisting of paraffins and polyethylene waxes.

3. The method of claim 1 wherein the blend is formed with from 0.25 to three weight percent wax.

4. The method of claim 3 wherein the blend is formed with 0.25 to less than two weight percent wax.

5. The method of claim 4 wherein the blend is formed with 0.5 to less than two weight percent wax.

6. The method of claim 1 wherein the wax has an average molecular weight of 500 to 800.

7. The method of claim 1 further comprising the step of heating the multilayer film at a temperature above the initial melting point of said wax, below the melting point of said resin, and below the distortion temperature of said film for at least five minutes.

8. The method of claim 7 wherein the wax has an average molecular weight between 500 and 1000.

9. The method of claim 7 wherein the film is heated at from 50° C. to 150° C. in said heating step.

10. The method of claim 7 wherein the film is heated for at least one hour in said heating step.

11. The method of claim 7 wherein the film is heated for at least 24 hours in said heating step.

12. The method of claim 1 wherein the thickness of each cap layer is less than two microns.

13. The method of claim 1 wherein the core layer resin is an isotactic homopolymer of propylene.

14. The method of claim 1 wherein the cap layers are formed from a material selected from the group consisting of random ethylene-propylene copolymers with up to ten weight percent ethylene, copolymers of propylene with butene, and terpolymers of propylene, ethylene, and butene.

15. The method of claim 1 wherein said core layer consists essentially of said polypropylene resin and said wax.

16. The method of claim 15 wherein the polyolefin of said cap layer is different from the polypropylene resin of said core layer.

17. A method of making a multilayer thermoplastic film having improved barrier and haze properties, comprising the steps of:
    (a) forming a blend of a polypropylene resin selected from the group consisting of isotactic homopolymers of propylene, copolymers of propylene with ethylene or butene, terpolymers of propylene with ethylene and butene and mixtures thereof, and an 0.25 to 15 wt. % of a crystalline, incompatible wax having an average molecular weight of 300 to 1000;
    (b) extruding and casting the blend to form a core layer of a film;
    (c) orienting the core layer in a first direction;
    (d) then providing on each side of the oriented core layer a polyolefin cap layer to provide a multilayer film, whereby loss of wax from said film is avoided; and
    (e) orienting the film of step (d) in a second direction transverse to the first direction.

18. The method of claim 17 wherein the wax is selected from the group consisting of paraffins and polyethylene waxes.

19. The method of claim 17 wherein the blend is formed with from 0.25 to three weight percent wax.

20. The method of claim 19 wherein the blend is formed with 0.25 to less than two weight percent wax.

21. The method of claim 20 wherein the blend is formed with 0.5 to less than two weight percent wax.

22. The method of claim 17 wherein the wax has an average molecular weight from 500 to 800.

23. The method of claim 17 further comprising the step of heating the product of step (e) at a temperature above the initial melting point of said wax, below the melting point of said resin, and below the distortion temperature of said film of step (d) for at least five minutes.

24. The method of claim 23 wherein the wax has an average molecular weight between 500 and 1000.

25. The method of claim 23 wherein the product of step (e) is heated at from 50° C. to 150° C. in said heating step.

26. The method of claim 23 wherein the product of step (e) is heated for at least one hour in said heating step.

27. The method of claim 23 wherein the product of step (e) is heated for at least 24 hours in said heating step.

28. The method of claim 17 wherein the thickness of each cap layer is less than two microns.

29. The method of claim 17 wherein the core layer resin is an isotactic homopolymer of propylene.

30. The method of claim 17 wherein the cap layers are formed of a material selected from the group consisting of random ethylene-propylene copolymers with up to ten weight percent ethylene, copolymers of propylene with butene, and terpolymers of propylene, ethylene, and butene.

31. The method of claim 17 wherein said core layer consists essentially of said polypropylene resin and said wax.

32. The method of claim 31 wherein the polyolefin of said cap layer is different from the polypropylene resin of said core layer.

* * * * *

UNITED STATES PATENT AND TRADEMARK OFFICE
CERTIFICATE OF CORRECTION

PATENT NO. : 6,033,514
DATED : March 7, 2000
INVENTOR(S) : Davis et al.

It is certified that error appears in the above-identified patent and that said Letters Patent is hereby corrected as shown below:

On the cover page, item [73], Assignee:  "QPF, LLG" to --QPF, LLC--.

Col. 6, line 55 delete "450" and substitute --45°-- therefor.

Col. 9, line 51 delete "Core" and substitute --core-- therefor.

Signed and Sealed this

Twentieth Day of February, 2001

Attest:

NICHOLAS P. GODICI

Attesting Officer  Acting Director of the United States Patent and Trademark Office